United States Patent [19]
Yasuda et al.

[11] Patent Number: 5,573,443
[45] Date of Patent: Nov. 12, 1996

[54] SPINDLE AND METHOD FOR DRIVING THE SAME

[75] Inventors: Issei Yasuda, Katano; Masayuki Takahashi; Toru Nakagawa, both of Hirakata, all of Japan

[73] Assignee: Matsushita Electric Industrial Co., Ltd., Osaka-fu, Japan

[21] Appl. No.: 141,219

[22] Filed: Oct. 26, 1993

[30] Foreign Application Priority Data

Oct. 26, 1992 [JP] Japan .................................. 4-287342

[51] Int. Cl.$^6$ ................................................ B24B 49/02
[52] U.S. Cl. ................................................ 451/11; 451/28
[58] Field of Search .................................. 451/5, 11, 28, 451/9

[56] References Cited

U.S. PATENT DOCUMENTS

| | | | |
|---|---|---|---|
| 4,180,946 | 1/1980 | Heijkenskjold | 451/24 |
| 4,956,945 | 9/1990 | Ooshima | 451/11 |
| 5,024,025 | 6/1991 | Kihara | 451/11 |
| 5,027,280 | 6/1991 | Ando | 451/9 |
| 5,133,158 | 7/1992 | Kihara | 451/11 |
| 5,205,078 | 4/1993 | Takara | 451/11 |

FOREIGN PATENT DOCUMENTS

| | | |
|---|---|---|
| 61-30353 | 2/1986 | Japan . |
| 1-127254 | 5/1989 | Japan . |
| 1-234162 | 9/1989 | Japan . |
| 1-234161 | 9/1989 | Japan . |
| 1-240266 | 9/1989 | Japan . |
| 1-240267 | 9/1989 | Japan . |

*Primary Examiner*—Jack W. Lavinder
*Attorney, Agent, or Firm*—Wenderoth, Lind & Ponack

[57] ABSTRACT

A spindle arrangement is provided for either holding a workpiece or mounting a working tool onto a rotary shaft in a cutting/grinding process. The spindle arrangement includes radial magnetic bearings for rotatably supporting the rotary shaft in a radial direction thereof by using suction forces of electromagnets, displacement sensors provided in the radial direction of the rotary shaft for measuring an amount of positional displacement of the rotary shaft, and a controlling device for comparing the measured amount of the positional displacement and a displacement command and then changing the suction forces of the radial electromagnets based on the compared result so as to cause agreement between the measured amount and the command. Instead of or in addition to those elements, the spindle can include a thrust magnetic bearing for rotatably supporting the rotary shaft in a thrust direction thereof by using suction forces of electromagnets, a displacement sensor provided in the thrust direction of the rotary shaft for measuring an amount of displacement of the rotary shaft, and a controlling device for comparing the measured amount of the displacement and a displacement command and then changing the suction forces of the thrust electromagnets based on the compared result so as to cause agreement between the measured amount and the command. A method for operating the spindle is also provided.

8 Claims, 7 Drawing Sheets

SPINDLE AND METHOD FOR DRIVING THE SAME

BACKGROUND OF THE INVENTION

The present invention relates to a spindle and a method for driving the spindle equipped with a rotary mechanism to be used as a rotating and cutting/grinding apparatus in a cutting or grinding process. The spindle accompanied by no mechanical loss resulting from friction and no backlash of a feed mechanism due to the employment of a magnetic bearing designed to support a rotary shaft in space in a contactless manner by the suction forces of electromagnets.

Conventionally, in order to provide a rotating and cutting/grinding apparatus for use in the cutting or grinding process, a rotary mechanism composed of rotary supporting devices such as bearings or the like and a cutting or grinding mechanism comprised of a sliding section and a driving section, both mechanisms formed in separate units, are coupled by a coupling device, to constitute the rotating and cutting/grinding mechanism.

Figure 10:
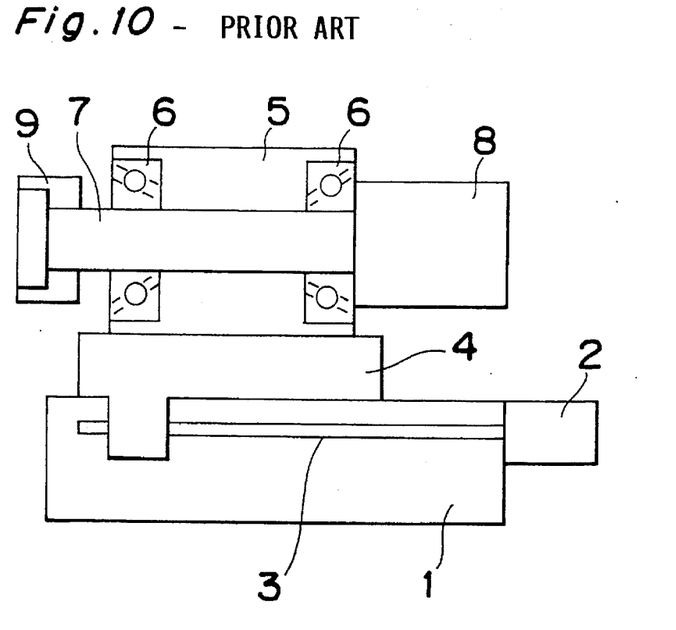
FIG. 10 is a schematic diagram explanatory of a conventional rotating and cutting/grinding apparatus.

A rotating and cutting/grinding apparatus generally employed will be depicted hereinbelow. FIG. 10 is a diagram of a rotary cutting or grinding mechanism using a grinding wheel 9. In FIG. 10, the rotation of a cutting or grinding motor 2 mounted at a fixed surface 1 of a slide is shifted in the backward-and-forward direction via a driving device 3 such as a ball screw, etc., to thereby move a sliding surface 4 of the apparatus back and forth as a cutting or grinding mechanism. At the same time, while bearings 6 of a main shaft are inserted into a housing 5 to support a rotary shaft 7, the rotary shaft 7 is driven by a motor 8 of the main shaft to thereby rotate the grinding wheel 9 as a function of a rotary mechanism.

Figure 11:
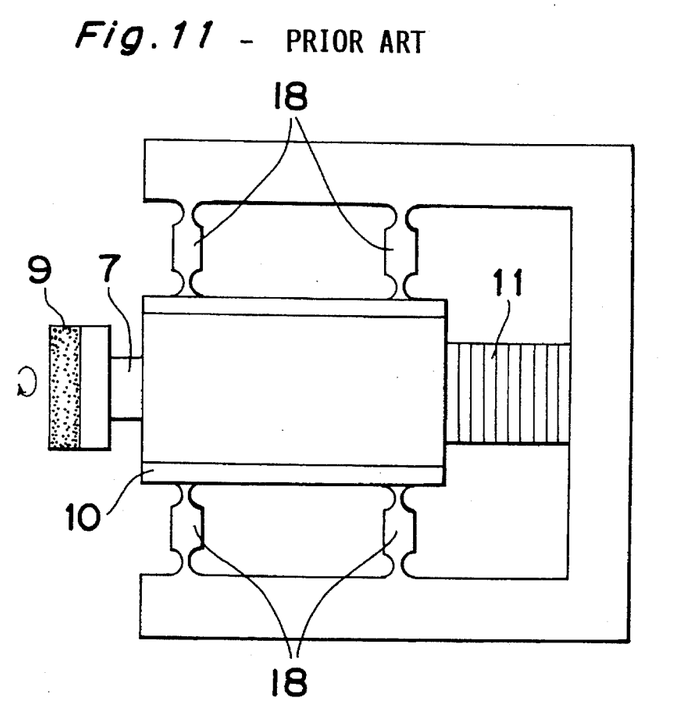
FIG. 11 is a schematic diagram of a conventional rotating and cutting/grinding apparatus.

Meanwhile, the twist or deflection of the driving device due to the weight of the slide is arranged to be reduced in a manner, e.g., shown in FIG. 11. That is, the rear portion of a moving part 10 supported by elastic hinges 18 is moved in its longitudinal direction by impressing a voltage to a piezoelectric driver 11. In this manner, cutting or grinding is carried out while the twist or deflection of the driving device is reduced.

In the former arrangement using a slide, however, the cutting or grinding amount becomes erroneously varied due to the clearance of the coupling part of the driving device as well as the twist or the like resulting from the driving resistance of each part. High-speed operation is hence unreliable.

In the latter method using elastic hinges, not only does the weight of the movable part become large, but the load necessary to shift the hinges is increased. Therefore, the method is applicable only to a driving part of relatively small size.

Since the rotary supporting mechanism and the cutting or grinding mechanism are constructed separately in the above prior art which inevitably gives rise to the increase of the weight of the movable part, such an inconvenience is brought about that each part is undesirably twisted. Likewise, with the employment of the elastic hinges, the weight of the movable part is increased and the shifting load of the hinges must be large, thus causing difficulties in the application of the method to a cutting or grinding mechanism with a rotary supporting mechanism.

SUMMARY OF THE INVENTION

The object of the present invention is therefore to provide a spindle and a method for driving the spindle which realize highly accurate cutting or grinding by a cutting or grinding mechanism equipped with a rotary supporting mechanism, while eliminating the aforementioned disadvantages in the prior art.

In accomplishing these and other objects, according to a first aspect of the present invention, there is provided a spindle arrangement for either one of holding a workpiece or mounting a working tool onto a rotary shaft in a cutting/grinding process, comprising: radial magnetic bearings for rotatably supporting the rotary shaft in a radial direction thereof by using suction (or magnetic) forces of electromagnets; displacement sensors provided in the radial direction of the rotary shaft for measuring an amount of positional displacement of the rotary shaft; and a controlling device for comparing the measured amount of the positional displacement and a displacement command and then changing the suction forces of the radial electromagnets based on the compared result so as to cause agreement between the measured amount and the command.

According to a second aspect of the present invention, there is provided a spindle arrangement for either one of holding a workpiece or mounting a working tool onto a rotary shaft in a cutting/grinding process, comprising: a thrust magnetic bearing for rotatably supporting the rotary shaft in a thrust direction thereof by using suction (or magnetic) forces of electromagnets; a displacement sensor provided in the thrust direction of the rotary shaft for measuring an amount of displacement of the rotary shaft; and a controlling device for comparing the measured amount of the displacement and a displacement command and then changing the suction forces of the thrust electromagnets based on the compared result so as to cause agreement between the measured amount with the command.

According to a third aspect of the present invention, there is provided a method of driving a spindle for either one of holding a workpiece or mounting a working tool onto a rotary shaft in a cutting/grinding process, comprising the steps of: rotatably supporting the rotary shaft with radial magnetic bearings in a radial direction of the rotary shaft by using suction forces of electromagnets of radial magnetic bearings; measuring an amount of positional displacement of the rotary shaft by using displacement sensors provided in the radial direction of the rotary shaft; and comparing the measured amount of the positional displacement and a displacement command and then changing the suction forces of the radial electromagnets based on the compared result so as to cause agreement between the measured amount with the command by a controlling device.

According to a fourth aspect of the present invention, there is provided a method of driving a spindle for either one of holding a workpiece or mounting a working tool onto a rotary shaft in a cutting/grinding process, comprising the steps of: rotatably supporting the rotary shaft in a thrust direction thereof by using suction (or magnetic) forces of electromagnets of a thrust magnetic bearing; measuring an amount of positional displacement of the rotary shaft with a displacement sensor provided in the thrust direction of the rotary shaft; and comparing the measured amount of the positional displacement and a displacement command and then changing the suction forces of the thrust electromagnets based on the compared result so as to cause agreement between the measured amount and the command by a controlling device.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

A spindle according to an embodiment of the present invention will be discussed hereinbelow with reference to the accompanying drawings.

Figure 1:
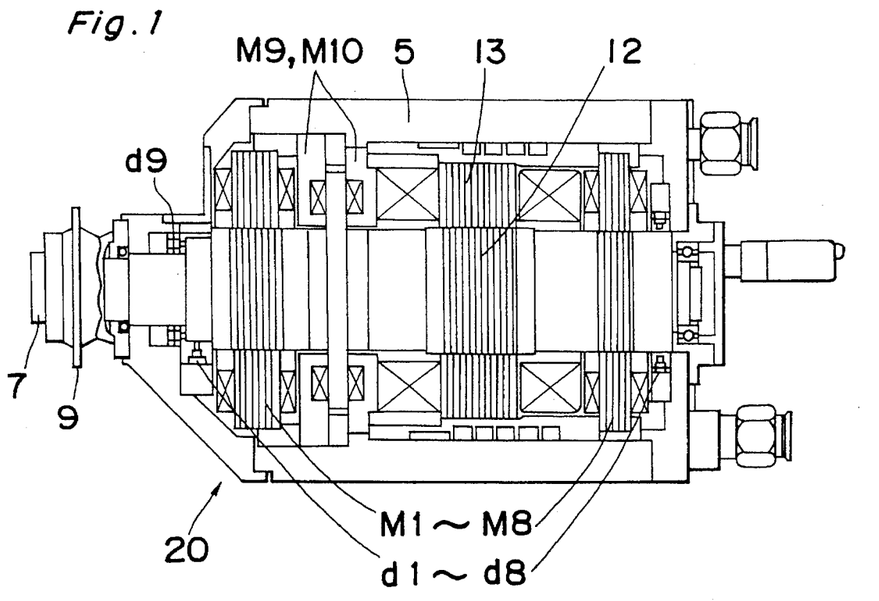
FIG. 1 is a structural diagram of a magnetic bearing spindle according to an embodiment of the present invention.

FIG. 1 shows the structure of the spindle using a magnetic bearing in the embodiment of the present invention. In FIG. 1, there are arranged electromagnets M1–M8 for the bearings at each side of a work tool such as a grinding wheel 9 and the rear portion of a rotary shaft 7 so as to rotatably support the rotary shaft 7. Moreover, electromagnets M9, M10 are provided for the bearings for positioning the rotary shaft 7 in the backward-and-forward direction. As a result, the rotary shaft 7 is rotatably supported by the electromagnets M1–M10 without contacting them. The position of the rotary shaft 7 in the radial direction is detected by displacement sensors d1–d8 respectively located at the working positions of the radial electromagnets M1–M8. A displacement sensor d9 is provided for the thrust electromagnets M9, M10. For example, these sensors d1–d8, d9 may be magnetic sensors.

A motor rotor 12 and a motor stator 13 of a motor are installed within a housing 5 between the two groups of the radial electromagnets M1–M8 to rotate the rotary shaft 7.

In the embodiment, a driving mechanism for rotating the rotary shaft 7 is incorporated into the same unit. However, the driving mechanism may be formed separately.

Figure 2:
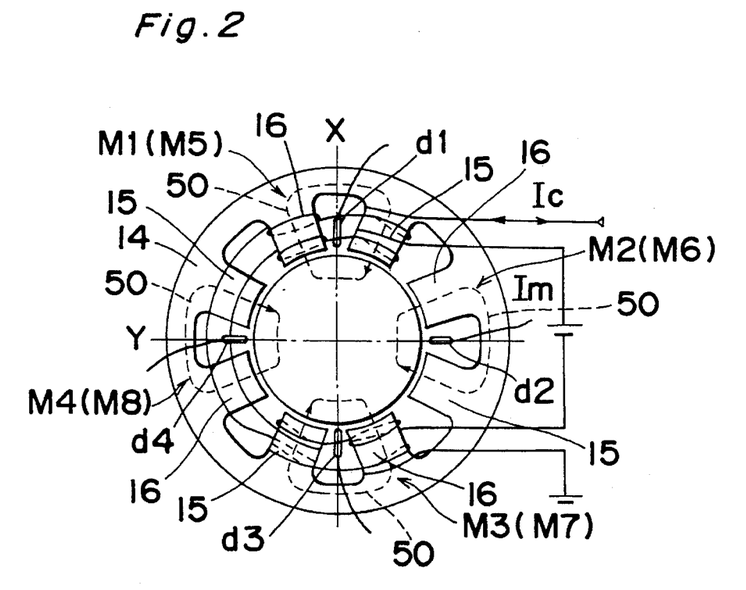
FIG. 2 is a structural diagram of a radial bearing in the spindle according to the embodiment of the present invention.

FIG. 2 indicates the structure of a radial magnetic bearing in FIG. 1.

The radial magnetic bearing is composed of the radial electromagnets M1–M8 and targets within the attracted rotary shaft 7. The radial electromagnets M1–M8 are obtained by winding floating coils 15 and control coils 16 around eight teeth of magnetic poles of a laminate steel plate 14. In FIG. 2, the floating coils 15 and control coils 16 in the Y axis are not shown in detail. Four pairs of magnetic loops 50, N and S pole pairs, are orthogonal to each other in the radial magnetic bearing. The following description will be made regarding the confronting two magnetic loops 50 supposing that one magnetic loop 50 forms one electromagnet of M1–M8.

Figure 3:
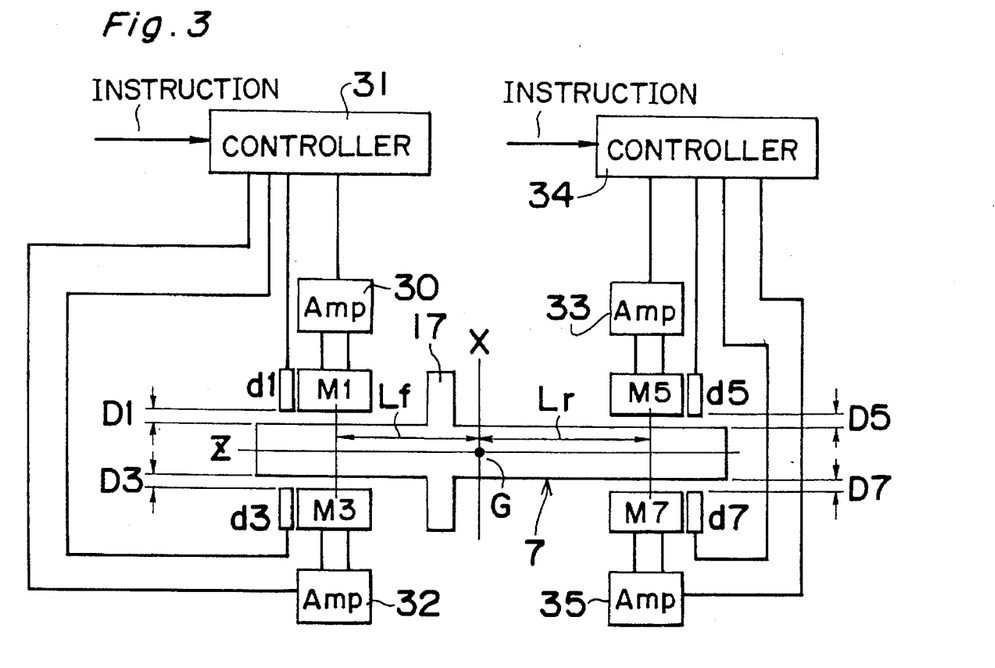
FIG. 3 shows an X cross section of the radial magnetic bearing.

FIG. 3 is a diagram of an X cross section of a radial control mechanism.

As shown in FIG. 3, the displacement sensors d1, d3 are connected to a controller 31, and the radial electromagnets M1, M3 are connected to the controller 31 via amplifiers 30, 32. The displacement sensors d5, d7 are connected to a controller 34, and the radial electromagnets M5, M7 are connected to the controller 34 via amplifiers 33, 35. The rotary shaft 7 is supported in space when a constant current Im is supplied to the floating coil 15. The position of the floating rotary shaft 7 is read by the displacement sensors d1, d3, and the difference of the reading values of the sensors d1, d3 on the X axis is calculated by the controller 31. Consequently, the rotary shaft 7 is moved by supplying a current Ic to the control coil 16 of each of the radial electromagnets M1, M3 by the controller 31 so as to make the reading values of the displacement sensors d1, d3 agree with each other. Such an operation is carried out by the sensors d5, d7, the amplifiers 33, 35 and the electromagnets M5, M7 on the X axis. The same process is executed regarding the position of the rotary shaft 7 on the Y axis by using other controllers and amplifiers, and the electromagnets M2, M4, M6, M8. Accordingly, the rotary shaft 7 is maintained an equal distance from the displacement sensors d1–d8.

A concrete method of how to move the rotary shaft 7 in the radial direction while the rotary shaft 7 is driven by the motor will be described below.

The rotary shaft 7 is separated the same distance from the displacement sensors d1, d3 and d5, d7 thanks to the aforementioned controlling arrangement in FIG. 3. Supposing that the rotary shaft 7 is to be driven by the feeding amount $\Delta d$ for cutting or grinding towards the electromagnets M3, M7, when the current Ic is fed to the control coil 16 at the front part of the rotary shaft 7 as shown in FIG. 2, the magnetic loop 50 of the electromagnet M1 is weakened, while that of the electromagnet M3 is to be intensified. As a result, the rotary shaft 7 is moved toward the side of the electromagnet M3. The reading values D1, D3 of the displacement sensors d1, d3 at this time change by the amount corresponding to the current Ic. An expression (1) below will be held by changing the current Ic fed to the control coil 16;

$$D1-D3=2\times\Delta d \quad (1)$$

Accordingly, the rotary shaft 7 performs cutting or grinding by the amount $\Delta d$ on the axis of the displacement sensors d1, d3 toward the side of the electromagnet M3.

As the same process is carried out also for the rear part of the rotary shaft 7 by the electromagnets M5, M7 and displacement sensors d5, d7, the rotary shaft 7 performs cutting or grinding by the amount $\Delta d$ in each direction of the electromagnets M3, M7 on the X cross section.

The rotary shaft 7 can also be used to perform cutting or grinding in the Y axis direction by means of the electromagnets M2, M4, M6, M8. Therefore, if it is controlled in two (X and Y axis) directions simultaneously, cutting or grinding in any desired direction perpendicular to the rotary shaft 7 is enabled.

A concrete method of how to move the rotary shaft 7 in the thrust direction while the rotary shaft 7 is driven will be depicted hereinbelow.

Figure 6:
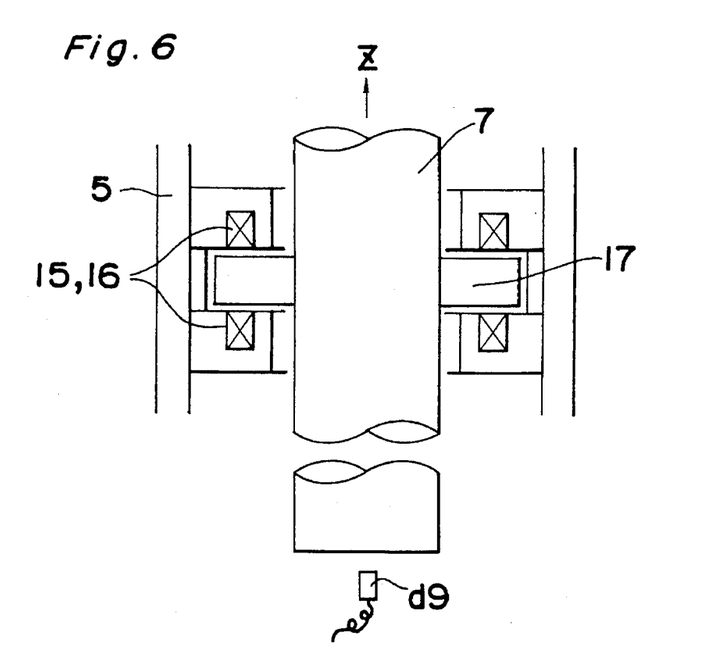
FIG. 6 is a structural diagram of a thrust magnetic bearing of the spindle according to the embodiment of the present invention.

FIG. 6 illustrates the structure of a thrust magnetic bearing in FIG. 1.

The thrust magnetic bearing is composed of a disk 17 on the rotary shaft 7, floating coils 15 and control coils 16 facing each other at both sides of the disk 17, and the displacement sensor d9.

The thrust magnetic bearing works to support the disk 17 at a fixed position by supplying the constant current In to the floating coils 15.

Figure 7:
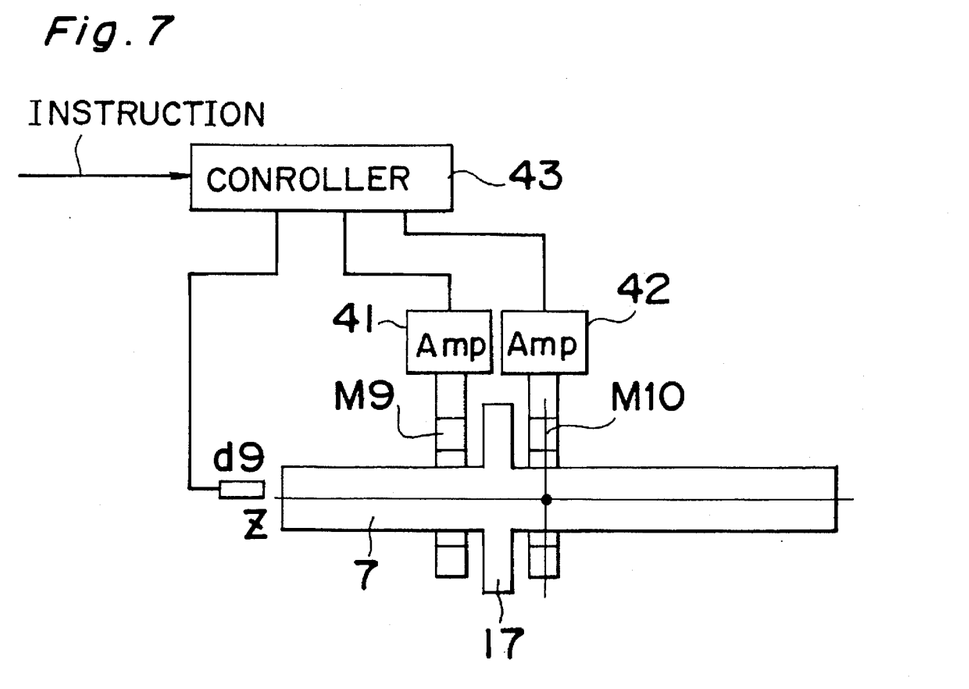
FIG. 7 is a diagram of the thrust magnetic bearing.

FIG. 7 is a diagram of a thrust control mechanism.

The disk 17 of the rotary shaft 7 is fixed a predetermined position by supplying a constant current In to the floating coils 15 opposite to each other at both sides of the disk 17. The distance between the end of the rotary shaft 7 and the displacement sensor d9 at this time is D9. In order to allow the rotary shaft 7 to move by the feeding amount $\Delta d$ for cutting or grinding to the side of the displacement sensor d9, the magnetic loop 50 of the electromagnet M9 is weakened, whereas the magnetic loop 50 of the electromagnet M10 is intensified by flowing a current Ic to the control coils 16 as shown in FIG. 6. The rotary shaft 7 is consequently moved towards the electromagnet M9. The reading value of the displacement sensor d9 is changed by the amount corresponding to the current Ic. The current Ic to the control coils 16 is changed to satisfy an expression (2) below;

$$D = D9 - \Delta d \tag{2}$$

As a result, the rotary shaft 7 is moved for cutting or grinding by the amount $\Delta d$ towards the electromagnet M9 on the axis thereof. The rotary shaft 7 can be moved in the axial direction while it is supported in space.

Figure 4:
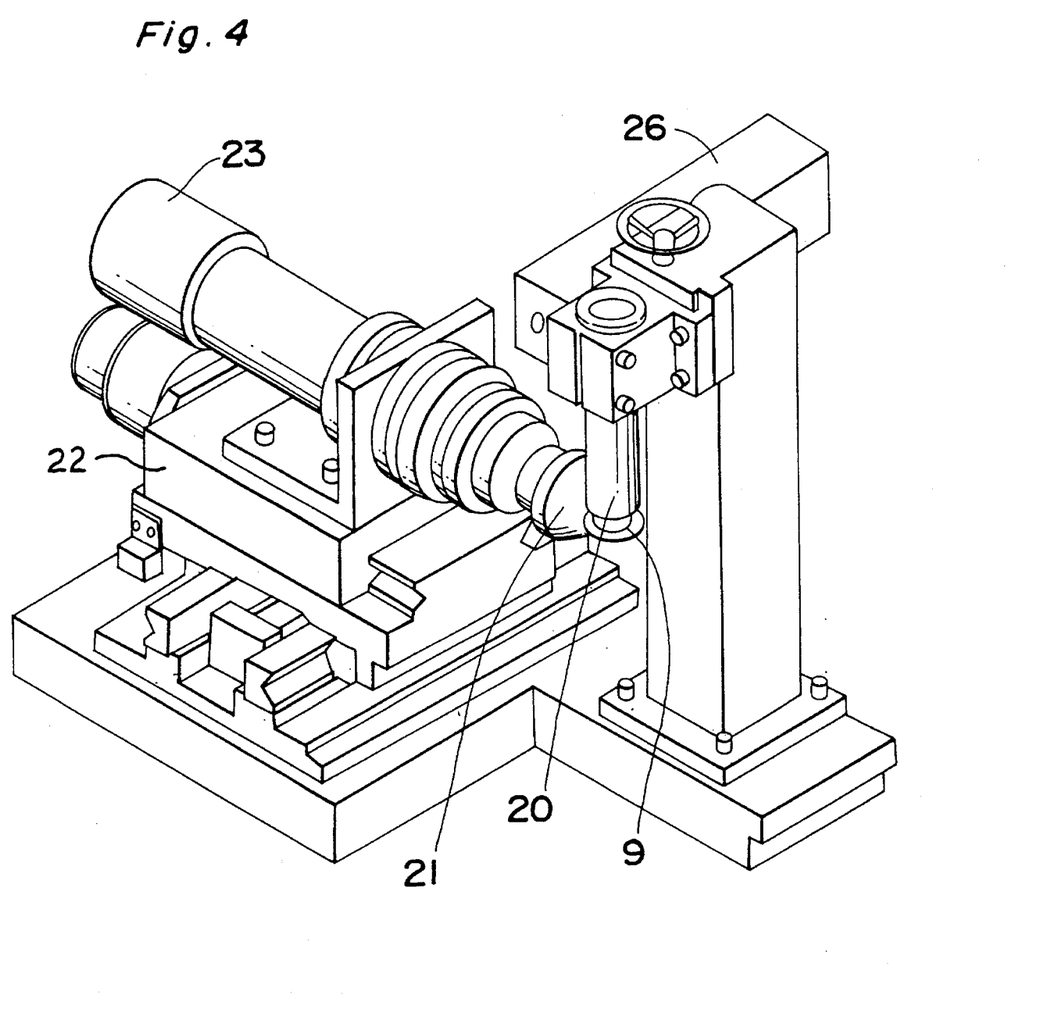
FIG. 4 is a perspective view of a cutting or grinding apparatus including the spindle.

FIG. 4 shows a cutting or grinding apparatus including the spindle. As shown in FIG. 4, a workpiece 21 to be processed such as a lens is detachably held at the end of a lens rotary spindle 23 arranged horizontally. The spindle 20 arranged vertically according to the embodiment of the present invention has the grinding wheel 9 or a cutting tool at the lower end of the spindle 20. The spindle 23 can move toward the grinding wheel 9 by a sliding table 22 capable of sliding the spindle 23 in directions perpendicular to each other by numerical control.

Figure 5:
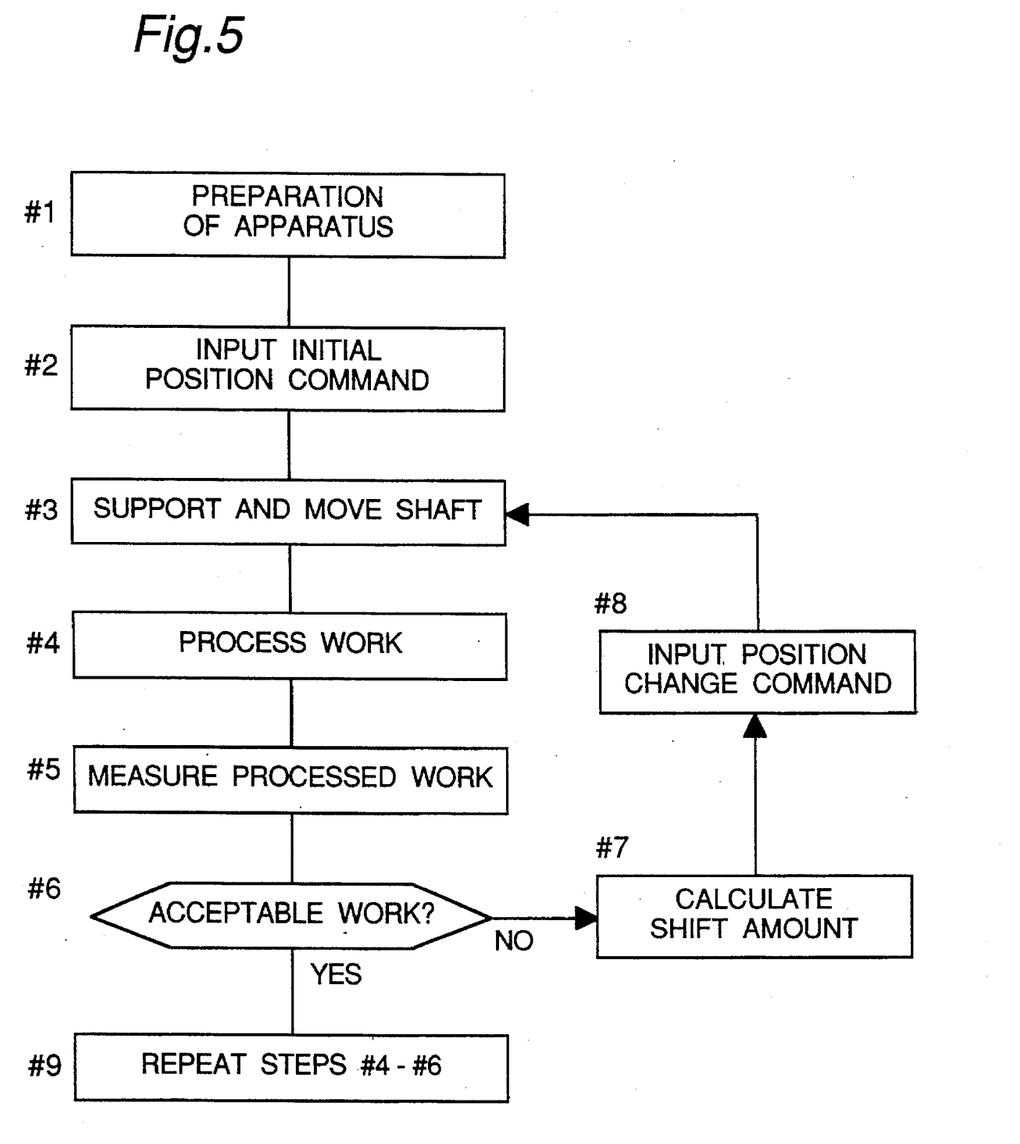
FIG. 5 is a flowchart showing the operation of the apparatus to move the rotary shaft in its radial or thrust direction.

The cutting or grinding operation of the apparatus will be described below. FIG. 5 is a flowchart showing the operation of the apparatus so as to move the rotary shaft 7 in its radial direction and/or thrust direction. In FIG. 5, the preparation of the apparatus such as attaching a lens 21 as a workpiece to the lens rotary spindle 23 and a grinding wheel 9 as a work tool to the spindle 20 is carried out at step #1. At step #2, an initial position command is inputted to the controller 31, 34, and/or 43 in FIG. 3 so that a current is supplied to the electromagnets M1–M8 and/or M9–M10 and then the rotary shaft 7 is rotatably supported by the electromagnets M1–M8 and/or M9–M10 of the magnetic bearings without any contact at step #3. Then, the rotary shaft 7 is rotated by the motor and fed by a feeding amount by the table 22 to grind or cut the workpiece 21 at step #4. After the completion of processing of the workpiece 21, the work 21 is measured by a measuring device 26 to check whether or not the work 21 is ground or cut by a predetermined amount at step #5. At step #6, when it is decided that the workpiece 21 is not processed by the predetermined amount and is not acceptable, the shift amount between the predetermined amount and a measured amount is calculated at step #7 and then a position change command based on the shift amount is inputted to the controller 31, 34, and/or 43 at step #8 to move the rotary shaft 7 in its radial direction and/or thrust direction, at step #3. At step #6, when it is decided that the workpiece 21 is processed by the predetermined amount and is acceptable, the next workpiece 21 is processed through the steps #4–#6. The cutting or grinding mechanism is integral with the rotary mechanism of the grinding wheel 9 or a cutting tool as above, so that cutting or grinding during the rotation of the grinding wheel 9 or a cutting tool becomes possible.

As described hereinabove, necessary cutting or grinding is insured in the cutting or grinding process or the like while the rotary shaft is supported in space without any resistance caused by contact. Therefore, the twist of each part due to the increase of the weight of the movable part is eliminated and at the same time, the reliable supporting rigidity enables highly accurate rotating and cutting/grinding operation.

A concrete method of how to incline the rotary shaft 7 to the housing 5 while the rotary shaft 7 is driven by the motor will be discussed.

FIG. 3 is a diagram of the X cross section of the radial control mechanism.

In accordance with the aforementioned controlling operation, the rotary shaft 7 is maintained the same distance from the displacement sensors d1, d3 and d5, d7. The following description will be made on the assumption that the rotary shaft 7 is moved by the inclining amount $\Delta d3$, $\Delta d5$ of an expression (3) towards the electromagnets M3, M5;

$$\Delta d3 / Lf = \Delta d5 / Lr \tag{3}$$

As shown in FIG. 2, when a current Ic is supplied to the control coil 16 at the front part of the rotary shaft 7, the magnetic loop 50 of the electromagnet M1 is weakened and the magnetic loop 50 of the electromagnet M3 is strengthened. The rotary shaft 7 is accordingly moved toward the electromagnet M3. The reading values D1, D3 of the displacement sensors d1, d3 are changed by the amount corresponding to the current Ic. An expression (4) will be satisfied by changing the current Ic supplied to the control coil 16;

$$D1 - D3 = 2 \times \Delta d3 \tag{4}$$

The rotary shaft 7 is thus moved toward the electromagnet M3 by the amount $\Delta d3$ on the axis of the displacement sensors d1, d3.

Moreover, as the current to the control coil 16 is changed so that the magnetic loop 50 of the electromagnet M5 is weakened and that of the electromagnet M7 is intensified at the rear part of the rotary shaft 7, an expression (5) will hold;

$$D5 - D3 = 2 \times \Delta d5 \tag{5}$$

The same procedure is executed for the displacement sensors d5, d7. Accordingly, the rotary shaft 7 is inclined relative to the housing 5 by the angle corresponding to that of the expression (3).

The rotary shaft 7 can be inclined also in the Y axis direction with the use of the electromagnets M2, M4, M6, M8. Therefore, when it is controlled in the X and Y directions simultaneously, the rotary shaft 7 can be inclined in a desired optional direction.

Figure 8:
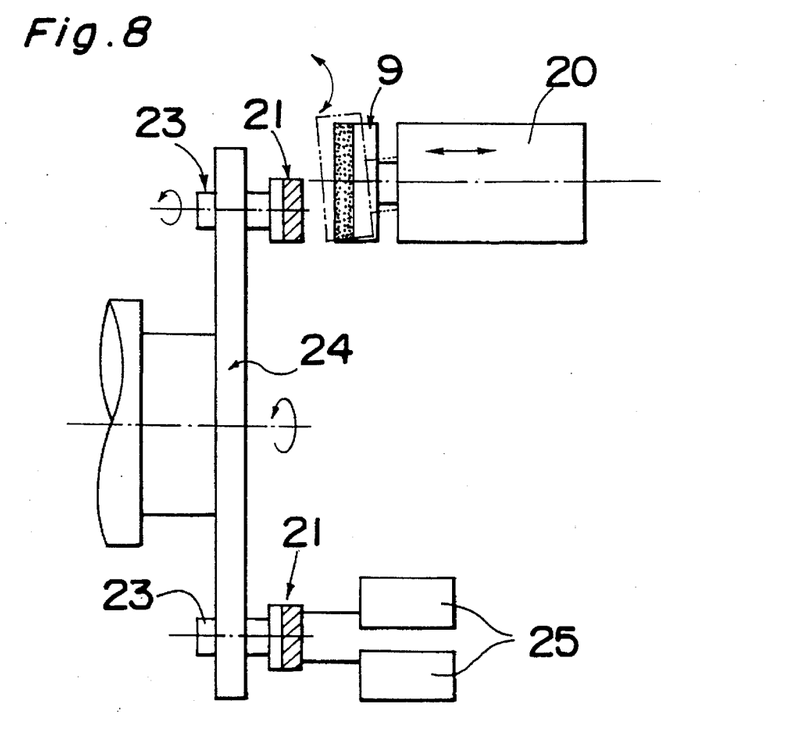
FIG. 8 is a perspective view of a cutting or grinding apparatus including the spindle.

FIG. 8 shows a cutting or grinding apparatus including the spindle capable of inclining the rotary shaft 7. As shown in FIG. 8, a workpiece 21 to be processed such as a lens is detachably held at the end of each of lens rotary spindles 23 horizontally arranged and capable of rotating around each axis. The spindles 23 are arranged at the peripheral portion of a rotary table 24. The work tool spindle 20 is faced one of the lens rotary spindles 23 for required processing. The workpiece 21 which is rotated by the lens rotary spindle 23 is cut or ground by the work tool such as the grinding wheel 9 while the grinding wheel 9 is inclined at a desired angle by the spindle 20. After the processing of the workpiece 21 is completed, the grinding wheel 9 is separated from the workpiece 21 and then the rotary table 24 is rotated to locate the next workpiece 21 rotatably supported by another lens rotary spindle 23 at the position facing the grinding wheel 9. The inclination of the processed workpiece 21 is measured by measuring devices 25 in order to decide whether or not the work 21 has the predetermined inclination.

Figure 9:
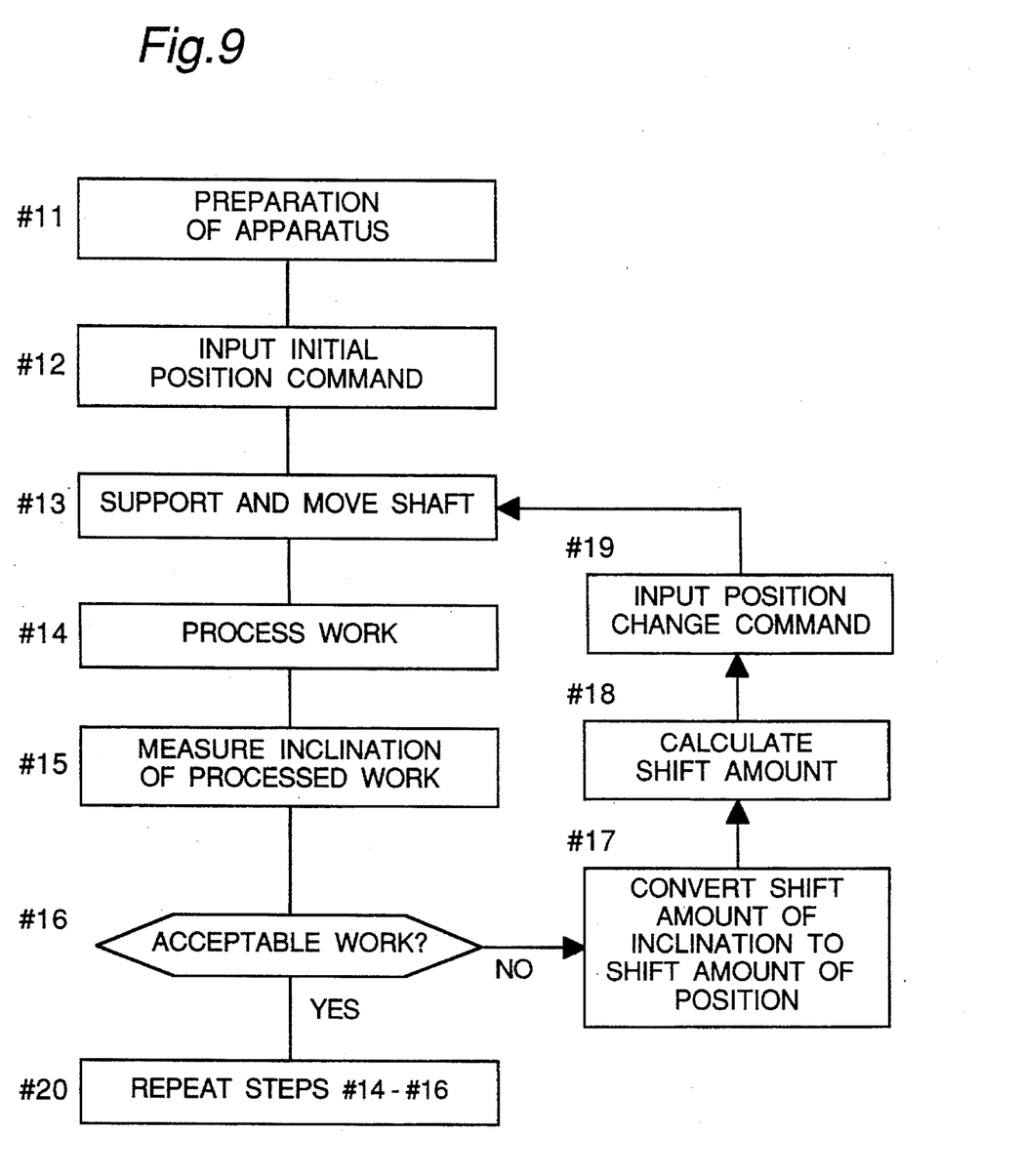
FIG. 9 is a flowchart showing the operation of the apparatus in FIG. 8 so as to incline the rotary shaft.

As shown in FIG. 9, the preparation of the apparatus such as attaching lenses 21 as workpiece to the lens rotary spindles 23 and a grinding wheel 9 as a work tool to the spindle 20 is carried out at step #11. At step #12, an initial position command is inputted to the controllers 31 and 34 in FIG. 3, so that a current is supplied to at least one of the electromagnets M1–M8 and then the rotary shaft 7 is rotatably supported by the electromagnets M1–M8 of the magnetic bearings without any contact at step #13, and the rotary shaft 7 is inclined by an angle corresponding to the current supplied to at least one electromagnet of the electromagnets M1–M8. Then, the rotary shaft 7 is rotated by the motor and fed by a feeding amount to grind or cut the workpiece 21 at step #14. After the completion of processing of the workpiece 21, the workpiece 21 is measured by the measuring device 25 to check whether or not the workpiece 21 has a predetermined inclined angle at step #15. At step #16, when it is decided that the workpiece 21 is not processed by the predetermined angle and is not acceptable, the shift amount between the predetermined amount and a measured amount is calculated and then converted into a positional displacement amount of the rotary shaft 7 at step #17. A correction amount based on the converted displacement amount is calculated at step #18. Then, a position change command based on the correction amount is inputted to the controllers 31 and 34 at step #19 to move the rotary shaft 7 in its radial direction at step #13. At step #16, when it is decided that the workpiece 21 is processed by the predetermined angle and is acceptable, the next workpiece 21 is processed through the steps #14–#16.

According to the spindle and the method for driving the spindle of the present invention as described hereinabove, the working surface of the grinding wheel can be positioned and adjusted with high accuracy while the rotary shaft is supported in space.

A spindle according to the present invention is provided with a magnetic bearing for supporting a rotary shaft by the suction forces of the electromagnets, in place of the bearing mechanism of the prior art, so that the rotary shaft is supported in the contactless fashion and moved when the suction forces of the electromagnets are changed. The difference of the suction forces of the electromagnets corresponding to the target shifting amount is ordered for the magnetic bearings and the moving amount of the rotary shaft is measured by a displacement sensor, in order to make the ordered value agree with the moving amount. Accordingly, positioning with high accuracy is achieved. Conventional disadvantages in the rotating and cutting/grinding apparatus are thus solved. The rotating and cutting/grinding apparatus of the present invention allows a rotary tool to make cutting or grinding highly accurately without generating distortion or the like.

In the embodiments, the spindles can be used as work rotary spindles to hold a workpiece 21, instead of a work tool such as a grinding wheel 9.

In the spindle in FIG. 1, the radial magnetic bearings or the thrust magnetic bearing can be omitted depending on a processing direction. That is, only the radial magnetic bearings may be used for processing in the radial direction, whereas only the thrust magnetic bearing may be used for processing in the thrust direction.

The displacement sensor d9 can be located at any position where the thrust displacement of the rotary shaft 7 can be detected by the displacement sensor d9, instead of the position where the displacement sensor d9 faces the end of the rotary shaft 7.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A spindle arrangement for use in holding a workpiece or mounting a work tool on a rotary shaft in a cutting or grinding process, said spindle arrangement comprising:

a plurality of electromagnetic bearings for rotatably supporting the rotary shaft with radially directed electromagnetic forces;

first, second, third and fourth pairs of displacement sensors provided radially about a rotational axis;

wherein said first and second pairs of said displacement sensors are provided at a first axial location, and said third and fourth pairs of said displacement sensors are provided at a second axial location spaced axially away from said first axial location;

wherein said first pair of said displacement sensors are located in diametrically opposite positions with respect to said rotation axis;

wherein said second pair of said displacement sensors are located in diametrically opposite positions with respect to said rotation axis, and said diametrically opposite positions of said second pair of said displacement sensors are angularly displaced by 90 degrees relative to said diametrically opposite positions of said first pair of said displacement sensors;

wherein said third pair of said displacement sensors are located in diametrically opposite positions with respect to said rotation axis;

wherein said fourth pair of said displacement sensors are located in diametrically opposite positions with respect to said rotation axis, and said diametrically opposite positions of said fourth pair of said displacement sensors are angularly displaced by 90 degrees relative to said diametrically opposite positions of said third pair of said displacement sensors; and wherein a controlling means is provided for comparing positional displacement amounts measured by said displacement sensors with a corresponding displacement command, and changing the electromagnetic forces of said electromagnetic bearings based on results of the comparison so as to cause agreement between the measured amount and the command.

2. A spindle arrangement as recited in claim 1, further comprising an electromagnetic thrust bearing for rotatably supporting the rotary shaft with axially directed electromagnetic force;

a thrust displacement sensor for measuring thrust displacement of the rotary shaft; and said controlling means comprises means for comparing a positional displacement amount measured by said thrust displacement sensor with a corresponding displacement command, and changing the electromagnetic force of said electromagnetic thrust bearing based on results of the comparison so as to cause agreement between the measured amount and the command.

3. A spindle arrangement as recited in claim 2, wherein the rotary shaft is rotatably mounted on said rotation axis and includes a workpiece or work tool mounting end; and said thrust displacement sensor is located adjacent said workpiece or work tool mounting end of said rotary shaft.

4. A spindle arrangement as recited in claim 1, wherein said controller means comprises means for inclining the rotary shaft relative to said rotation axis by changing the electromagnetic forces of said electromagnetic bearings based on an incline command, and for comparing positional displacement amounts measured by said displacement sensors with the incline command, and changing the electromagnetic forces of said electromagnetic bearings based on results of the comparison so as to cause agreement between the measured amount and the incline command.

5. A method of operating a spindle arrangement for use in holding a workpiece or mounting a work tool on a rotary shaft in a cutting or grinding process, said method comprising the steps of:

rotatably supporting the rotary shaft with radially directed electromagnetic forces of a plurality of electromagnetic bearings;

providing first, second, third and fourth pairs of displacement sensors radially about a rotational axis such that said first and second pairs of said displacement sensors are provided at a first axial location, said third and fourth pairs of said displacement sensors are provided at a second axial location spaced axially away from said first axial location, said first pair of said displacement sensors are located in diametrically opposite positions with respect to said rotation axis, said second pair of said displacement sensors are located in diametrically opposite positions with respect to said rotation axis, said diametrically opposite positions of said second pair of said displacement sensors are angularly displaced by 90 degrees relative to said diametrically opposite positions of said first pair of said displacement sensors, said third pair of said displacement sensors are located in diametrically opposite positions with respect to said rotation axis, said fourth pair of said displacement sensors are located in diametrically opposite positions with respect to said rotation axis, and said diametrically opposite positions of said fourth pair of said displacement sensors are angularly displaced by 90 degrees relative to said diametrically opposite positions of said third pair of said displacement sensors;

measuring amounts of positional displacement of the rotary shaft using said first, second, third and fourth pairs of displacement sensors; and comparing positional displacement amounts measured by said displacement sensors with a corresponding displacement command, and changing the electromagnetic forces of said electromagnetic bearings based on results of the comparison so as to cause agreement between the measured amount and the command.

6. A method as recited in claim 5, further comprising the steps of rotatably supporting the rotary shaft with axially directed electromagnetic force of an electromagnetic thrust bearing;

measuring thrust displacement of the rotary shaft with a thrust displacement sensor; and comparing a positional displacement amount measured by said thrust displacement sensor and a corresponding displacement command, and changing the electromagnetic force of said electromagnetic thrust bearing based on results of the comparison so as to cause agreement between the measured amount and the command.

7. A method as recited in claim 6, further comprising the step of locating said thrust displacement sensor adjacent an end of the rotary shaft to which said workpiece or work tool is mounted.

8. A method as recited in claim 5, further comprising the step of inclining the rotary shaft relative to said rotation axis by changing the electromagnetic forces of said electromagnetic bearings based on an incline command, and comparing positional displacement amounts measured by said displacement sensors with the incline command, and changing the electromagnetic forces of said electromagnetic bearings based on results of the comparison so as to cause agreement between the measured amount and the incline command.

* * * * *